US012768326B2

(12) United States Patent
Azuma et al.

(10) Patent No.: US 12,768,326 B2
(45) Date of Patent: Oct. 20, 2026

(54) FUEL INJECTION VALVE

(71) Applicant: HITACHI ASTEMO, LTD., Hitachinaka (JP)

(72) Inventors: Kohei Azuma, Hitachinaka (JP); Yasuhiko Nabeshima, Hitachinaka (JP); Motoki Sanada, Hitachinaka (JP); Seita Tokumoto, Hitachinaka (JP)

(73) Assignee: Hitachi Astemo Ltd., Ibaraki (JP)

( * ) Notice: Subject to any disclaimer, the term of this patent is extended or adjusted under 35 U.S.C. 154(b) by 0 days.

(21) Appl. No.: 18/872,583

(22) PCT Filed: Dec. 5, 2022

(86) PCT No.: PCT/JP2022/044744
§ 371 (c)(1),
(2) Date: Dec. 6, 2024

(87) PCT Pub. No.: WO2024/121904
PCT Pub. Date: Jun. 13, 2024

(65) Prior Publication Data
US 2025/0163875 A1 May 22, 2025

(51) Int. Cl.
*F02M 61/18* (2006.01)
*F02M 61/16* (2006.01)

(52) U.S. Cl.
CPC ........ *F02M 61/1853* (2013.01); *F02M 61/16* (2013.01); *F02M 61/168* (2013.01); *F02M 2200/8061* (2013.01)

(58) Field of Classification Search
CPC ....... F02M 61/1853; F02M 2200/8061; F02M 61/168; F02M 61/16
See application file for complete search history.

(56) References Cited

FOREIGN PATENT DOCUMENTS

| | | | | |
|---|---|---|---|---|
| JP | 2000145589 | A | * | 5/2000 |
| JP | 2002-130088 | A | | 5/2002 |
| JP | 2009-228526 | A | | 10/2009 |
| JP | 2010-174764 | A | | 8/2010 |
| JP | 2011-163292 | A | | 8/2011 |
| JP | 2019-157678 | A | | 9/2019 |
| JP | 2022-139378 | A | | 9/2022 |

OTHER PUBLICATIONS

PCT/ISA/210 from International Application PCT/JP2022/044744 with the English translation thereof.
PCT/ISA/237 from International Application PCT/JP2022/044744.

* cited by examiner

*Primary Examiner* — Marina A Tietjen
(74) *Attorney, Agent, or Firm* — Carrier, Shende & Associates P.C.; Joseph P. Carrier; Jeffrey T. Gedeon

(57) ABSTRACT

The present invention provides a fuel injection valve that suppresses variation in fuel injection performance caused by distortion of an orifice. The fuel injection valve includes: a fuel passage (1), through which fuel is introduced; and an orifice member (3) press-fitted to the inner wall of the fuel passage (1). The orifice member (3) includes: a cylindrical part (6) fixed to the inner wall of the fuel passage (1) by press-fitting; an end wall (7) which covers one end of the cylindrical part (6) and in which the orifice (2) is provided; and an annular stress absorption part (8) interposed between the one end of the cylindrical part (6) and the outer periphery of the end wall (7) to absorb stress caused by the press-fitting.

2 Claims, 10 Drawing Sheets

FUEL INJECTION VALVE

TECHNICAL FIELD

The present invention relates to a fuel injection valve provided with an orifice member having an orifice in a fuel passage.

BACKGROUND ART

There has conventionally been known a fuel injection valve provided with an orifice member having an orifice in a fuel passage inside a housing (refer to, for example, Patent Literature 1). This fuel injection valve includes a cylindrical fuel inlet part connected to a fuel distribution cap branched from a fuel rail pipe connected to a discharge port of a fuel pump, and an orifice member is attached to the entrance of the cylindrical fuel inlet part.

The orifice member is composed of a cylindrical mounting part and a metal diaphragm provided in such a manner as to cover the upstream end of the cylindrical mounting part. An orifice is provided at the center of the metal diaphragm. The inner peripheral surface of the entrance of the cylindrical fuel inlet part connected to the fuel distribution cap has a cylindrical fitting recess and an annular stepped part connected to the downstream end of the cylindrical fitting recess.

A fuel filter mounting flange is placed on the annular stepped part, and a fuel filter is mounted thereon. After that, the mounting cylindrical part of the orifice member is press-fitted into the fitting recess of the cylindrical fuel inlet part, and the downstream end of the mounting cylindrical part is brought into close contact with the flange of the fuel filter, thereby installing the orifice member to the cylindrical fuel inlet part.

CITATION LIST

Patent Literature

Patent Literature 1: Japanese Patent Application Laid-Open No. 2022-139378

SUMMARY OF INVENTION

Technical Problem

However, according to the fuel injection valve of the above-mentioned Patent Literature 1, the orifice member is installed to the cylindrical fuel inlet part by press-fitting the mounting cylindrical part of the orifice member into the fitting recess of the cylindrical fuel inlet part. This leads to a risk that the orifice member is deformed due to the tension force applied to the mounting cylindrical part during press-fitting, and this deformation is transmitted to the orifice, causing distortion of the orifice. This distortion may lead to variation in the fuel injection performance of the fuel injection valve.

In view of the problem with the prior art described above, an object of the present invention is to provide a fuel injection valve that suppresses variation in fuel injection performance caused by distortion of an orifice.

Solution to Problem

A fuel injection valve according to the present invention includes:

a fuel passage through which fuel to be injected is introduced; and an orifice member which has an orifice and is press-fitted to an inner wall of the fuel passage, wherein the orifice member includes:

a cylindrical part fixed to the inner wall by press-fitting;

an end wall which covers one end of the cylindrical part and in which the orifice is provided; and an annular stress absorption part interposed between the one end of the cylindrical part and an outer periphery of the end wall to absorb stress caused by the press-fitting.

According to the present invention, the cylindrical part of the orifice member press-fitted to the inner wall of the fuel passage has distortion caused by stress received from the inner wall during press-fitting. The distortion is, however, absorbed by the annular stress absorption part between the cylindrical part and the end wall, thereby suppressing transmission to the orifice of the end wall. Consequently, the orifice maintains the designed dimensions thereof as much as possible, thus making it possible to provide a fuel injection valve that suppresses variation in fuel injection performance.

In the present invention, the annular stress absorption part may be connected to the one end of the cylindrical part and the end wall via bent parts. With this arrangement, the transmission of the stress at the time of press-fitting from the cylindrical part to the annular stress absorption part, and further, the transmission from the annular stress absorption part to the end wall can be controlled by the bent parts, and the concentration of stress at both end edges of the annular stress absorption part can be suppressed. This, in combination with the stress absorption effect by the annular stress absorption part, makes it possible to more effectively avoid the distortion of the orifice.

In the present invention, the end wall may be located on a downstream side of the cylindrical part, and the orifice member may be provided with a flange extending radially outward from an upstream end of the cylindrical part. With this arrangement, when press-fitting the orifice member into the fuel passage, the attitude of the orifice member can be easily checked by bringing the flange and the opening of the fuel passage into contact with each other.

DESCRIPTION OF EMBODIMENTS

Figure 1:
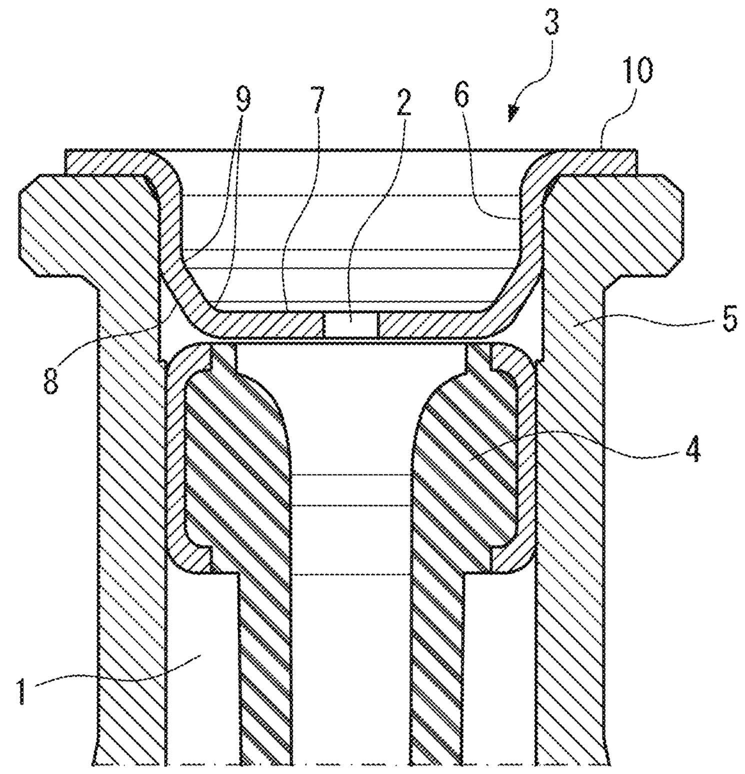
FIG. 1 is a sectional view illustrating an orifice member of a fuel injection valve according to a first embodiment of the present invention.

The following will describe embodiments of the present invention with reference to the accompanying drawings. FIG. 1 illustrates an orifice member of a fuel injection valve according to a first embodiment of the present invention. As illustrated in FIG. 1, the fuel injection valve includes a fuel passage 1 which is provided in the housing thereof and through which fuel to be injected is introduced, and an orifice member 3 which has an orifice 2 and which is press-fitted to the inner wall of the fuel passage 1.

More specifically, the orifice member 3 is fixed by being press-fitted into a cylindrical fuel inlet part 5 on the upstream side of a part of the fuel passage 1 where a fuel filter 4 is installed.

The orifice member 3 includes a cylindrical part 6, which is fixed to the inner wall of the fuel passage 1 by press-fitting, an end wall 7, which covers one end of the cylindrical part 6 and in which the orifice 2 is provided, and an annular stress absorption part 8, which is interposed between one end of the cylindrical part 6 and the outer periphery of the end wall 7 and which absorbs stress attributable to the press-fitting. It should be noted that the one end of cylindrical part 6 is the end on the downstream side in the present embodiment.

The annular stress absorption part 8 is connected to the downstream one end of the cylindrical part 6 and the end wall 7 via bent parts 9. The end wall 7 is located on the downstream side of the cylindrical part 6. The orifice member 3 has a flange 10 that extends radially outward from the upstream end of the cylindrical part 6. The flange 10 is in contact with the end of the cylindrical fuel inlet part 5.

Figure 2:
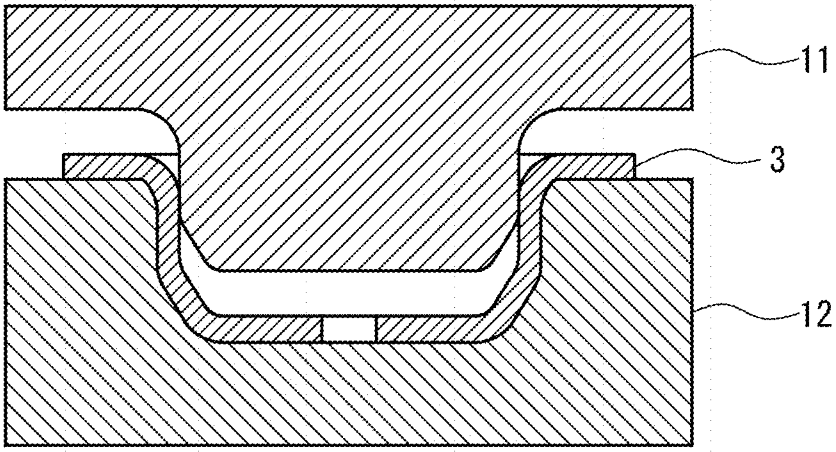
FIG. 2 is a schematic diagram illustrating how the orifice member in FIG. 1 is formed.

FIG. 2 illustrates how the orifice member 3 is formed. As illustrated in FIG. 2, the orifice member 3 is formed by pressing a metal plate, which is a base material, by using upper and lower dies 11 and 12 having the shape of the orifice member 3 and by providing the orifice 2 therein. As the metal plate, a stainless steel plate, for example, can be used.

Figure 3A:
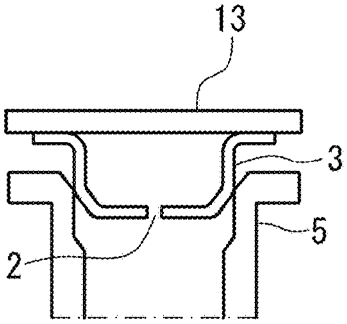
FIG. 3A to FIG. 3C are schematic diagrams illustrating how the orifice member in FIG. 1 is press-fitted into a cylindrical fuel inlet part of the fuel injection valve.
Figure 3B:
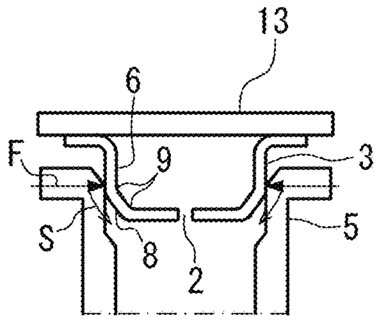
Figure 3C:
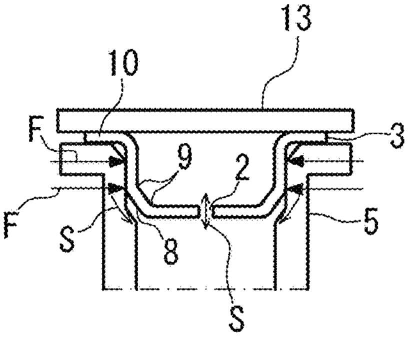

FIG. 3A to FIG. 3C illustrate how the orifice member 3 is press-fitted into the cylindrical fuel inlet part 5. First, the orifice member 3 is positioned at the opening of the cylindrical fuel inlet part 5 such that the end on the orifice 2 side faces in a downstream direction, as illustrated in FIG. 3A. Then, as illustrated in FIG. 3B, the orifice member 3 is pressed in the downstream direction by a pressing member 13. At this time, the downstream end of the cylindrical part 6 is subjected to a radially inward force F from the inner wall of the cylindrical fuel inlet part 5, causing stress (distortion) S in the cylindrical part 6.

However, the stress (distortion) S is absorbed and suppressed by the annular stress absorption part 8 and the bent parts 9 on both sides thereof, and hence, is not significantly transmitted to the end wall 7. When the orifice member 3 is further pressed until the flange 10 comes in contact with the end of the cylindrical fuel inlet part 5 as illustrated in FIG. 3C, the press-fitting is completed, thus completing the installation of the orifice member 3 to the cylindrical fuel inlet part 5.

At this point also, the stress (distortion) S due to the force F from the inner wall of the cylindrical fuel inlet part 5 is absorbed and suppressed by the annular stress absorption part 8 and the bent parts 9 on both sides thereof, and hence, is not significantly transmitted to the end wall 7. Thus, in the orifice member 3 after the installation thereof is completed, the orifice 2 is maintained as close as possible to the designed shape and position.

Figure 4A:
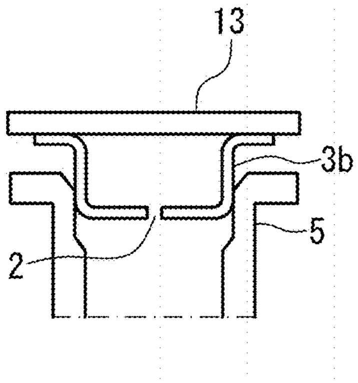
FIG.4A PRIOR ART
FIG. 4A to FIG. 4C are schematic diagrams illustrating how a conventional orifice member having no annular stress absorption part is press-fitted into a cylindrical fuel inlet part of a fuel injection valve.
Figure 4B:
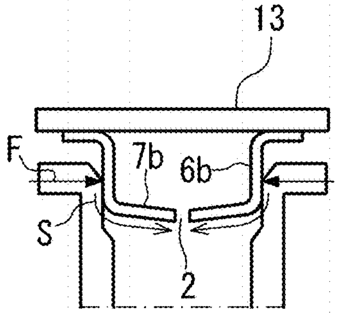
FIG.4B PRIOR ART
Figure 4C:
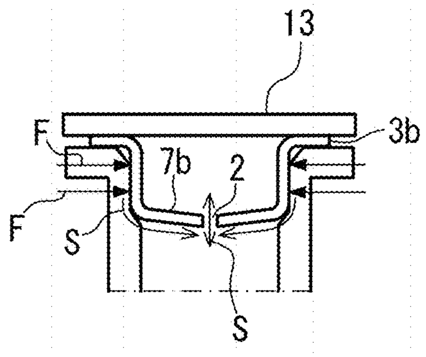
FIG.4C PRIOR ART

FIG. 4A to FIG. 4C illustrate how a conventional orifice member 3*b* that does not have the annular stress absorption part 8 is press-fitted into the cylindrical fuel inlet part 5. In this case, when the orifice member 3*b* is positioned at the opening of the cylindrical fuel inlet part 5 as illustrated in FIG. 4A, and press-fitting is started by the pressing member 13 as shown in FIG. 4B, the downstream end of a cylindrical part 6*b* receives a radially inward force F from the inner wall of the cylindrical fuel inlet part 5, thus generating the stress (distortion) S inside the cylindrical part 6*b*. This stress (distortion) S is transmitted as is to an end wall 7*b*.

Further, even when the press-fitting is completed as illustrated in FIG. 4C, the stress (distortion) S caused by the force F from the inner wall of the cylindrical fuel inlet part 5 is transmitted to the end wall 7*b* without being absorbed. For this reason, in the orifice member 3*b* after the installation thereof is completed, the orifice 2 has a different shape and position, as compared with the orifice 2 in the present embodiment of FIG. 3C.

Figure 5:
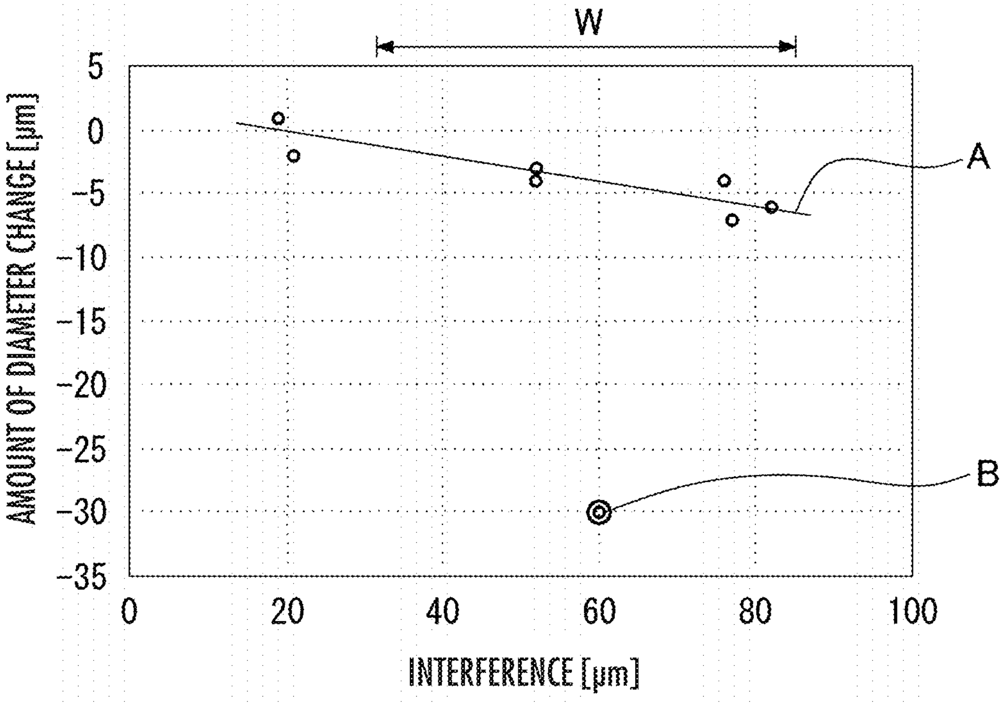
FIG. 5 is a graph illustrating the results of actual measurements of the relationship between an interference [μm] and the deformation amount (the amount of diameter change [μm]) of the orifice when the orifice member in FIG. 1 is press-fitted into the cylindrical fuel inlet part of the fuel injection valve.

FIG. 5 illustrates the results of actual measurements of the relationship between an interference [μm] for press-fitting the orifice member 3 into the cylindrical fuel inlet part 5 and the deformation amount (the amount of change in diameter [μm]) of the orifice 2. The results are indicated by a graph curve A in the figure. The results show that the amount of change in diameter of the orifice 2 is approximately 7 [μm] or less within an expected range W of an interference in mass production.

In contrast, in the case of the conventional orifice member 3*b* without the annular stress absorption part 8 (refer to FIG. 4A to FIG. 4C), as indicated by a spot B in the figure, when the interference is 60 [μm] within the expected range W, the amount of change in diameter of the orifice 2 is 30 [μm], which is significantly larger than that of the present embodiment.

Figure 6:
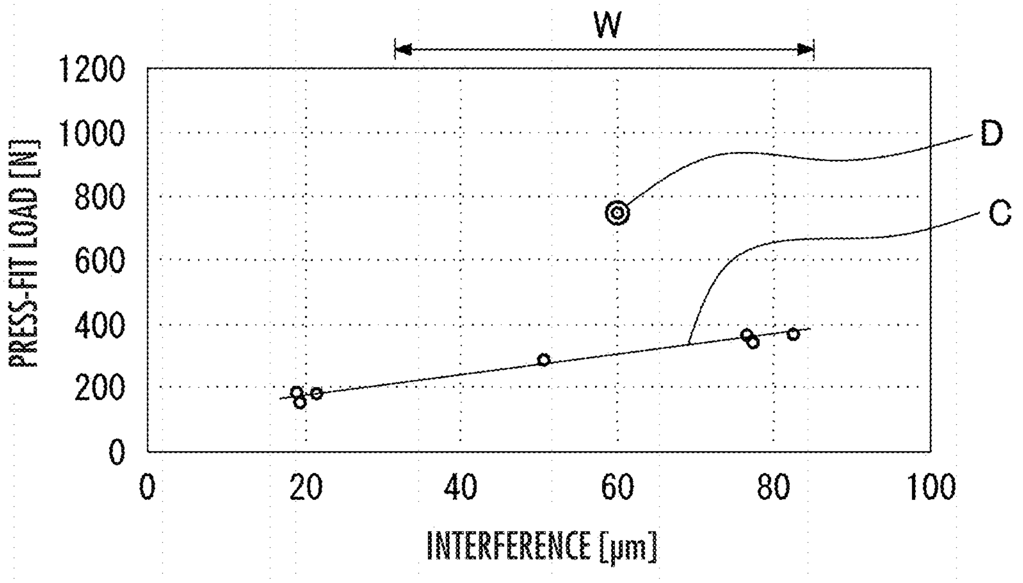
FIG. 6 is a graph illustrating the results of actual measurements of the relationship between the interference [μm] and a press-fit load [N] required for press-fitting when the orifice member in FIG. 1 is press-fitted into the cylindrical fuel inlet part of the fuel injection valve.

FIG. 6 illustrates the results of actual measurements of the relationship between the interference [μm] for press-fitting the orifice member 3 into the cylindrical fuel inlet part 5 and the press-fit load [N] required for press-fitting. The results are indicated by a graph curve C. In consideration of equipment requirements, the press-fit load is targeted to be 1000 [N] or less.

As indicated by the graph curve C in FIG. 6, it is seen that, in the expected range W of the interference in mass production, the press-fit load is nearly 400 [N] or less, which is sufficiently lower than the target press-fit load 1000 [N].

In contrast, in the case of the conventional orifice member 3*b* without the annular stress absorption part 8 (refer to FIG. 4A to FIG. 4C), as indicated by a spot D in the figure, the press-fit load when the interference is 60 [μm] within the expected range W is approximately 750 [N], which is smaller than the target press-fit load 1000 [N], but significantly larger than that of the present embodiment.

As described above, according to the present embodiment, in the cylindrical part 6 of the orifice member 3, which has been press-fitted to the inner wall of the fuel passage 1, the distortion due to the stress received from the inner wall at the time of press-fitting is absorbed by the annular stress absorption part 8, and the transmission of the distortion to the orifice 2 is suppressed. Thus, the orifice 2 maintains the dimensions thereof as close as possible to designed dimensions, making it possible to provide a fuel injection valve that suppresses variation in fuel injection performance.

Further, the annular stress absorption part 8 is connected to one end of the cylindrical part 6 and the end wall 7 via the bent parts 9. Consequently, the transmission of the stress at the time of press-fitting from the cylindrical part 6 to the annular stress absorption part 8 and further to the end wall 7 is controlled by the bent parts 9, thus making it possible to suppress the concentration of the stress at both end edges of the annular stress absorption part 8.

Figure 7A:
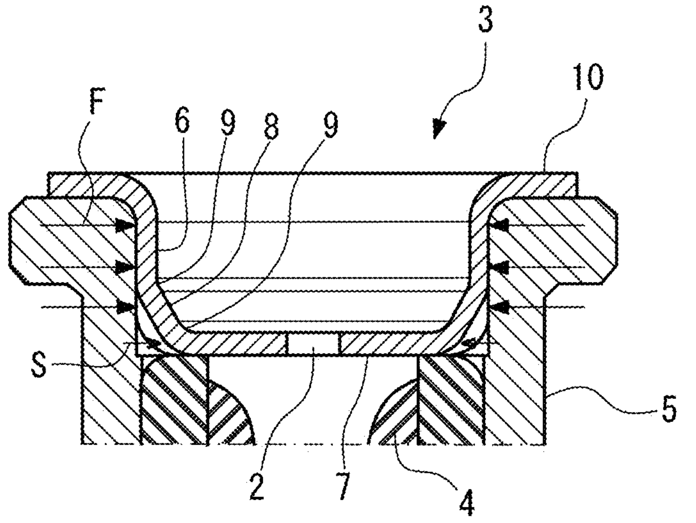
FIG. 7A is an explanatory diagram illustrating the effect of the orifice member in FIG. 1 for preventing the distortion of the orifice.
Figure 7B:
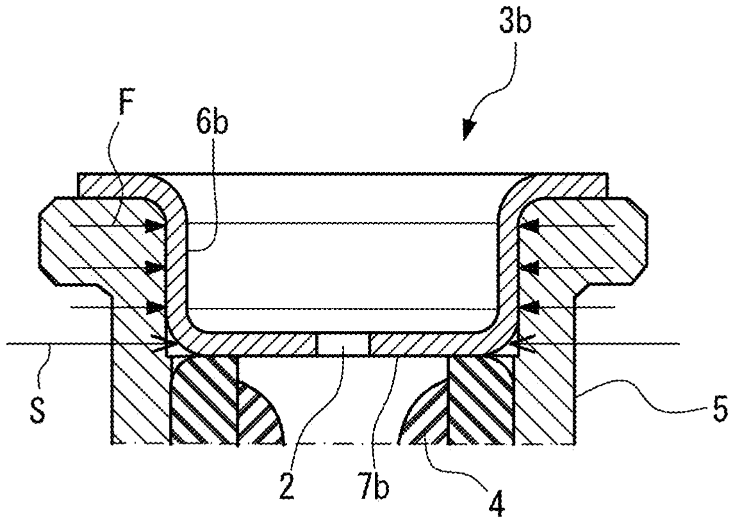
FIG.7B PRIOR ART
FIG. 7B is an explanatory diagram illustrating comparison with a conventional orifice member.

Therefore, according to the orifice member 3 of the present embodiment, as illustrated in FIG. 7A, as compared with the conventional orifice member 3*b* without the annular stress absorption part 8 illustrated in FIG. 7B, the stress (distortion) S generated in the end wall 7 due to the force F received by the cylindrical part 6 during press-fitting is more effectively avoided by the bent parts 9 in combination with the stress absorption effect of the annular stress absorption part 8, thus making it possible to maximize the prevention of the distortion of the orifice 2. In addition, the pressing force required for press-fitting can be reduced.

Further, the orifice member 3 includes the flange 10, which extends radially outward from the upstream end of the cylindrical part 6, so that the attitude of the orifice member 3 can be easily checked by bringing the flange 10 into contact with the opening of the fuel passage 1 when press-fitting the orifice member 3 into the fuel passage 1.

Figure 8:
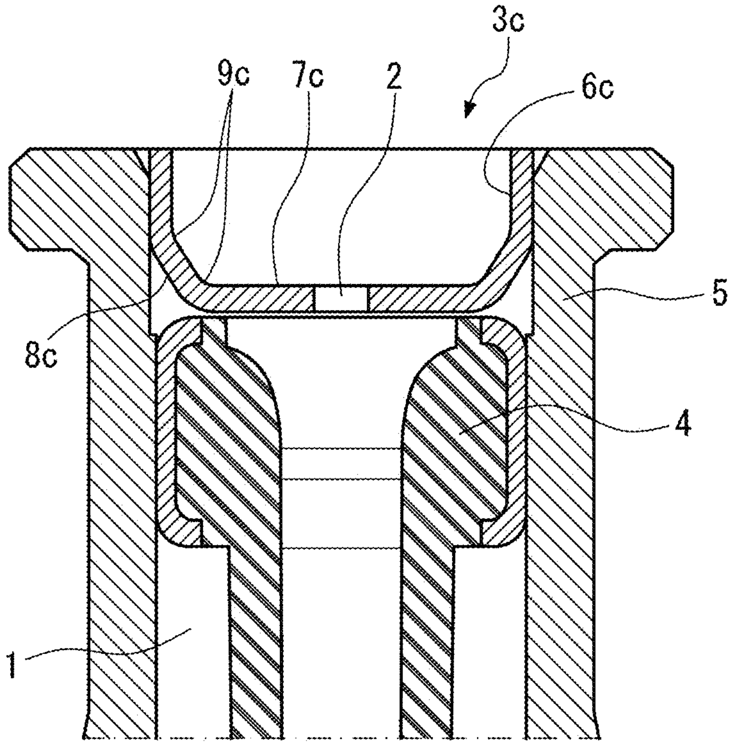
FIG. 8 is a sectional view illustrating an orifice member of a fuel injection valve according to a second embodiment of the present invention.

FIG. 8 illustrates an orifice member of a fuel injection valve according to a second embodiment of the present invention. This orifice member 3*c* corresponds to the orifice member 3 in FIG. 1 with the flange 10 removed. In other respects, the orifice member 3*c* has the same configuration as that of the orifice member 3 in FIG. 1 and provides the same effects.

Figure 9:
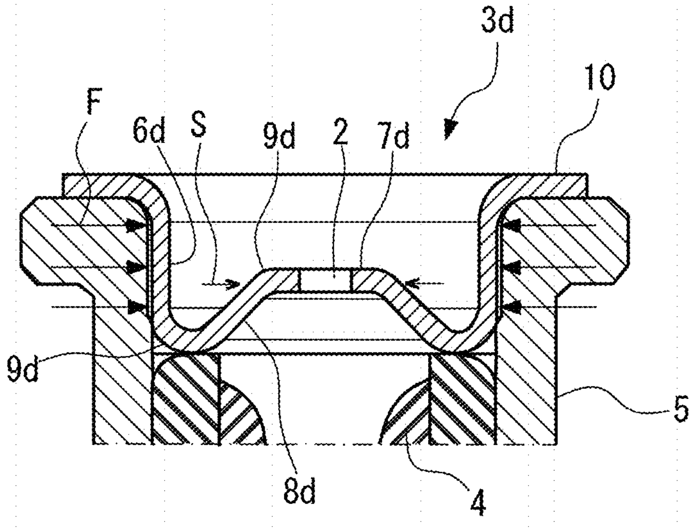
FIG. 9 is a sectional view illustrating an orifice member of a fuel injection valve according to a third embodiment of the present invention.

FIG. 9 illustrates an orifice member of a fuel injection valve according to a third embodiment of the present invention. In this orifice member 3*d*, an annular stress absorption part 8*d* has a truncated cone shape with the diameter thereof decreasing toward the upstream side. Further, an end wall 7*d* has a diameter that is approximately half that of the end wall 7 of the orifice member 3 in FIG. 1.

Thus, a cylindrical part 6*d* is longer than the cylindrical part 6 of the orifice member 3 in FIG. 1. The bending angles of bent parts 9*d* between the cylindrical part 6*d* and the annular stress absorption part 8*d* are approximately 45°. The bending angles of the bent parts 9*d* between the annular stress absorption part 8*c* and the end wall 7*d* are approximately 135°.

In the case of the orifice member 3*d* also, the stress (distortion) S generated in the end wall 7*d* due to the force F received by the cylindrical part 6 during press-fitting into a cylindrical fuel inlet part 5 is more effectively suppressed by the bent parts 9*d* in combination with the stress absorption effect of the annular stress absorption part 8*d*, thus making it possible to maximize the prevention of the distortion of the orifice 2. In other respects, the orifice member 3*d* has the same configuration as that of the orifice member 3 in FIG. 1, and provides the same effects.

The analytically predicted value of the amount of diameter deformation of the orifice 2 caused by press-fitting is, for example, approximately 0.01 [mm] for the orifice member 3*d* if the value is 0.008 [mm] for the orifice member 3 in FIG. 1. Further, the analytically predicted value of the press-fit load when press-fitting into the cylindrical fuel inlet part 5 is approximately 707.3 [N] for the orifice 2 of the orifice member 3*d* if the value is 419.1 [N] for the orifice member 3 in FIG. 1.

Figure 10:
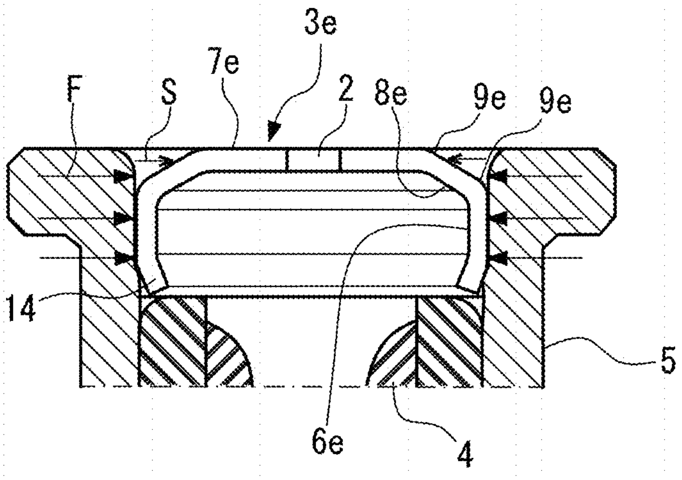
FIG. 10 is a sectional view illustrating an orifice member of a fuel injection valve according to a fourth embodiment of the present invention.

FIG. 10 illustrates an orifice member 3*e* of a fuel injection valve according to a fourth embodiment of the present invention. In this orifice member 3*e*, an annular stress absorption part Se, bent parts 9*e* on both sides of the annular stress absorption part 8*e*, and an end wall 7*e* are positioned on the upstream side of a cylindrical part 6*e*. Further, the lower end of the cylindrical part 6*e* has a tapered guide part 14 having the diameter thereof decreasing toward the downstream side so as to serve as a guide for press-fitting into a cylindrical fuel inlet part 5.

In other words, except for the guide part 14, the orifice member 3*e* has a configuration in which the upstream side and downstream side of the orifice member 3*c* in FIG. 8 are inverted. Except for the effect of the flange 10, the orifice member 3*e* also provides the same effects as those of the orifice member 3 in FIG. 1.

The analytically predicted value of the amount of diameter deformation of the orifice 2 caused by press-fitting is, for example, approximately 0.017 [mm] for the orifice member 3*e* if the value is 0.008 [mm] for the orifice member 3 in FIG. 1. Further, the analytically predicted value of the press-fit load when press-fitting into the cylindrical fuel inlet part 5 is approximately 547.4 [N] for the orifice member 3*e* if the value is 419.1 [N] for the orifice member 3 in FIG. 1.

The above has described the embodiments of the present invention; however, the present invention is not limited thereto. For example, the bent parts on both sides of the annular stress absorption part may be omitted.

DESCRIPTION OF REFERENCE NUMERALS

1 . . . fuel passage; 2 . . . orifice; 3, 3*b*, 3*c*, 3*d*, 3*e* . . . orifice member; 4 . . . fuel filter; 5 . . . cylindrical fuel inlet part; 6, 6*b*, 6*c*, 6*d*, 6*e* . . . cylindrical part; 7, 7*b*, 7*c*, 7*d*, 7*e* . . . end wall; 8, 8*c*, 8*d*, Se . . . annular stress absorption part; 9, 9*c*, 9*d*, 9*e* . . . bent part; 10 . . . flange; 11 . . . die; 12 . . . die; 13 . . . pressing member; 14 . . . guide part; A . . . graph curve; B . . . spot; C . . . graph curve; D . . . spot; F . . . force; S . . . stress (distortion); and W . . . expected range of interference.

The invention claimed is:

1. A fuel injection valve comprising: a fuel passage through which fuel to be injected is introduced; and an orifice member which has an orifice and is press-fitted to an inner wall of the fuel passage, wherein the orifice member includes:

a cylindrical part fixed to the inner wall by press-fitting;

a flange that extends radially outward from an upstream end of the cylindrical part to a diameter larger than the inner diameter of the fuel passage;

an end wall which is positioned on a downstream side of the cylindrical part, covers the downstream end of the cylindrical part and in which the orifice is provided; and an annular stress absorption part interposed between the one end of the cylindrical part and an outer periphery of the end wall to absorb stress caused by the press-fitting.

2. The fuel injection valve according to claim 1, wherein the annular stress absorption part is connected to the one end of the cylindrical part and the end wall via bent parts.

* * * * *